(12) United States Patent
Hirakawa

(10) Patent No.: US 7,573,661 B2
(45) Date of Patent: Aug. 11, 2009

(54) LENS DEVICE

(75) Inventor: Akinobu Hirakawa, Saitama (JP)

(73) Assignee: Fujinon Corporation, Saitama (JP)

( * ) Notice: Subject to any disclaimer, the term of this patent is extended or adjusted under 35 U.S.C. 154(b) by 69 days.

(21) Appl. No.: 11/889,312

(22) Filed: Aug. 10, 2007

(65) Prior Publication Data

US 2008/0043351 A1    Feb. 21, 2008

(30) Foreign Application Priority Data

Aug. 18, 2006  (JP) .............................. 2006-223369

(51) Int. Cl.
*G02B 7/02*  (2006.01)
*G02B 15/14* (2006.01)

(52) U.S. Cl. .................... 359/823; 359/694; 359/700

(58) Field of Classification Search ......... 359/694–703, 359/819–823

See application file for complete search history.

(56) References Cited

U.S. PATENT DOCUMENTS

| 4,089,590 A | 5/1978 | Sakata et al. ................ 359/706 |
| 4,848,884 A * | 7/1989 | Enomoto .................... 359/696 |
| 4,974,949 A | 12/1990 | Tanaka et al. ............... 359/704 |
| 6,967,784 B2 * | 11/2005 | Ichino ........................ 359/694 |

FOREIGN PATENT DOCUMENTS

| JP | 2000-232603 A | 8/2000 |
| JP | 2006-64972 A | 3/2006 |

* cited by examiner

*Primary Examiner*—Mohammed Hasan
(74) *Attorney, Agent, or Firm*—Birch, Stewart, Kolasch & Birch, LLP

(57) ABSTRACT

The invention provides a floating lens device capable of moving a plurality of lens groups by a different amount, wherein the lens device can be miniaturized in a direction of the optical axis. A lens device according to the invention includes: a fixed lens barrel; lens frames respectively holding a plurality of focus lens groups having a movement pattern different from each other; cam pins arranged respectively in the lens frames; a cam cylinder rotatably supported and at the same time having cam grooves engaged respectively with the cam pins. The lens frame is disposed in the inner side of the lens frame and combined with the lens frame in a nested manner, and the cam pins are disposed at a position different from each other in a circumferential direction and at the same time at substantially the same position in a direction of the optical axis.

2 Claims, 11 Drawing Sheets

LENS DEVICE

BACKGROUND OF THE INVENTION

1. Field of the Invention

The present invention relates to a lens device, and more particularly to a lens device mounted in the camera body of a television camera.

2. Description of the Related Art

In a lens device mounted in the camera body of a television camera, aberrational variations such as spherical aberration, field curvature or coma aberration must be satisfactorily corrected. Thus, there has been proposed a floating imaging lens in which the lens system is divided into a plurality of groups, and each lens group is moved along the optical axis at a different velocity from each other when focusing is performed to correct the aberration, whereby satisfactory optical performance is maintained in focusing the lens on a short distance object. For example, Japanese Patent Application Laid-Open No. 2006-64972 has proposed a two-group floating lens device capable of satisfactorily correcting aberrational variations, in which two lens groups are moved a different amount from each other.

By the way, as the drive mechanism for moving two lens groups at different velocities, for example, a cam mechanism described in Japanese Patent Application Laid-Open No. 2000-232603 can be used. More specifically, cam pins are arranged in a protruding manner on the outer circumferential surface of lens frames that hold respective lens groups, and these cam pins are each made to penetrate through a straight groove of a fixed cylinder and at the same time to engage with a plurality of cam grooves of the cam cylinder. According to this cam mechanism, when the cam cylinder is rotated, each cam pin moves along the respective cam grooves, so each lens group can move longitudinally in a direction of the optical axis.

However, when the above described cam mechanism is used as the floating system, the plurality of cam pins arranged in the respective lens frames are disposed at a distance from each other in a direction of the optical axis, resulting in a problem that the cam cylinder in which the plurality of cam grooves are formed is extended in a direction of the optical axis and thus the size of the device becomes large. Consequently, in the case of the lens device having a limited length in a direction of the optical axis, the cam mechanism cannot be used as the floating system having plural lens groups.

The present invention has been devised in view of these circumstances, and an object thereof is to provide a floating lens device capable of moving a plurality of lens groups by a different amount, wherein the lens device can be miniaturized in a direction of the optical axis.

SUMMARY OF THE INVENTION

To achieve the above object, according to a first aspect of the present invention, there is provided a lens device including: a plurality of focus lens groups; a plurality of movement lens frames respectively holding the plurality of focus lens groups; a plurality of cam pins arranged respectively in the plurality of movement lens frames; a fixed lens barrel supporting the plurality of movement lens frames so that the movement lens frames are movable in a direction of the optical axis; and a cam cylinder supported rotatably by the fixed lens barrel and at the same time having a plurality of cam grooves engaged respectively with the plurality of cam pins, wherein the plurality of movement lens frames are disposed such that a part of one movement lens frame overlaps with another movement lens frame in a direction of the optical axis, and are combined in a nested manner, wherein the plurality of cam pins are disposed at a different position from each other in a circumferential direction, and at the same time the cam pin of the one movement lens frame and the cam pin of another said movement lens frame are disposed at substantially the same position in a direction of the optical axis when the movement lens frames are brought into closest proximity to each other.

According to the first aspect of the present invention, since the plurality of movement lens frames overlap with each other in a direction of the optical axis, the plurality of cam pins arranged in a protruding manner in the respective movement lens frames can be disposed at a different position from each other in a circumferential direction and at the same time at substantially the same position in a direction of the optical axis. Accordingly, the plurality of cam grooves engaged with the plurality of cam pins can be formed at substantially the same position in a direction of the optical axis. Consequently, the cam cylinder can be shortened in a direction of the optical axis and thus the lens device can be miniaturized in a direction of the optical axis.

According to a second aspect of the present invention, there is provided the lens device according to the first aspect of the present invention, wherein the plurality of movement lens frames are each provided with a guide member protruding from the outer circumferential surface of the movement lens frame and at the same time extending outwards in a direction of the optical axis, a straight groove in a direction of the optical axis is formed in the guide member, and a guide pin engaged with the straight groove is arranged in the fixed lens barrel, and wherein when the plurality of movement lens frames are combined in a nested manner, the guide member of one lens frame lies between the guide members of the other lens frames and thus the guide members are disposed in an alternate manner.

According to the second aspect of the present invention, since the guide members of each movement lens frame are disposed in an alternate manner, even when a guide member having a large length in a direction of the optical axis is arranged, the guide members are prevented from colliding with each other. Consequently, the distance between the movement lens frames can be shortened and thus the movement lens frames can be disposed in proximity to each other in a direction of the optical axis.

According to the second aspect of the present invention, since the guide device constituted of the guide member and guide pin is arranged in addition to the cam mechanism, the resistance occurring when the movement lens frame is moved can be reduced and thus the movement lens frame can be smoothly moved.

According to a third aspect of the present invention, there is provided the lens device according to the second aspect of the present invention, wherein the guide pin has a roller rotatably supported, and is engaged with the straight groove via the roller, and wherein the rotation axis of the roller and the mounting axis in mounting the guide pin in the fixed lens barrel are disposed in an eccentric manner.

According to the third aspect of the present invention, since the rotation axis of the roller and the mounting axis of the guide pin are disposed in an eccentric manner, the position of the roller can be easily adjusted and thus the roller can be made to abut against the guide groove unfailingly.

According to the present invention, the plurality of movement lens frames are configured so as to overlap with each other in a direction of the optical axis, whereby the cam pins of each movement lens frame are disposed at a different position in a circumferential direction and at the same time at substantially the same position in a direction of the optical axis. Consequently, the cam cylinder can be shortened in a direction of the optical axis and thus the lens device can be miniaturized.

DETAILED DESCRIPTION OF THE PREFERRED EMBODIMENTS

A lens device according to the present invention will be described in detail below with reference to the accompanying drawings showing a preferred embodiment thereof.

Figure 1:
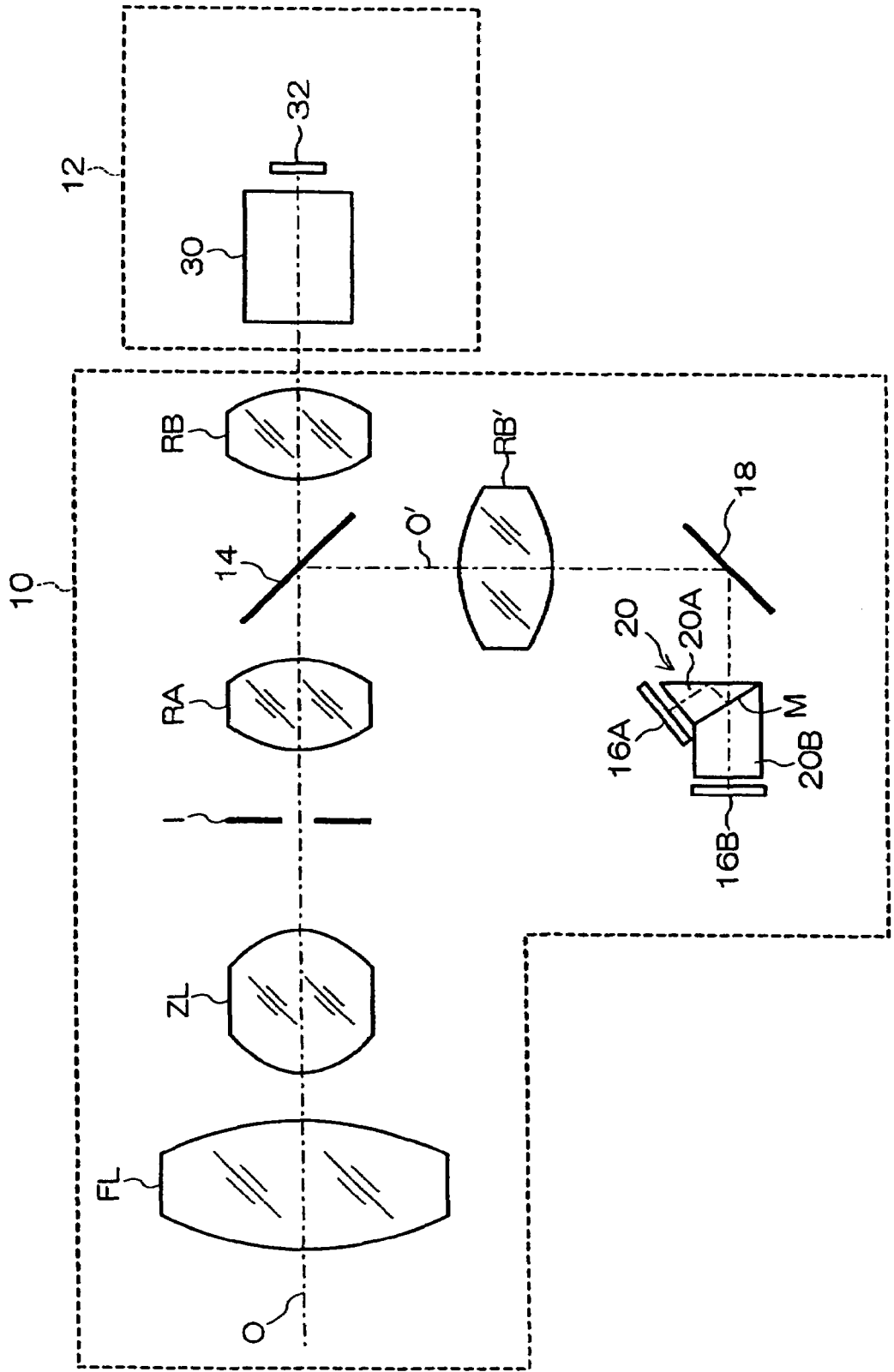
FIG. 1 is a schematic diagram illustrating an imaging optical system of a television lens device in which a lens device according to the present invention is used.

FIG. 1 is a schematic diagram illustrating an imaging optical system of a television lens device in which the lens device according to the present invention is used. The television lens device 10 illustrated in FIG. 1 is mounted and used in the camera body 12 of a broadcast-use or professional-use television camera.

As illustrated in FIG. 1, in the imaging optical system of the television lens device 10, there is arranged a half mirror 14. Using this half mirror 14, an optical path for AF along the optical axis O' is branched from the ordinary main optical path along the optical axis O that guides subject light to the camera body 12. More specifically, the imaging optical system includes the main optical path along the optical axis O for guiding subject light to the camera body 12 and the optical path for AF along optical axis O' branched from the optical path of the optical axis O.

Arranged on the main optical path are, from the front side (subject side) rightward, a focus lens (group) FL, a zoom lens (group) ZL, an aperture I, a front side relay lens (group) RA, a half mirror 14, and a rear side relay lens (group) RB.

The focus lens (group) FL is, as described later, constituted of a plurality of lens groups; when a part of the lens groups move in a direction of the optical axis O, the focus position (in-focus position) changes. The zoom lens ZL is supported in such a manner as to be movable in a direction of the optical axis O; when the zoom lens ZL moves longitudinally in a direction of the optical axis O, the zoom ratio (focal length) changes. The aperture I is configured so as to open and close; when the position (opening) of the aperture I changes, the amount of subject light passing through the imaging optical system changes.

Subject light from a subject incident on the imaging lens passes through the focus lens FL, zoom lens ZL, aperture I, front side relay lens RA, half mirror 14 and rear side relay lens RB one after the other and then enters the optical system in the camera body 12. In the optical system of the camera body 12, there are arranged a color splitting optical system 30 for splitting the incident subject light into wavelengths of three colors, that is, red (R), green (G) and blue (B), and CCDs for video use provided for each color (R, G, B) for capturing images of each color of the split subject light. It is noted that the CCDs for video use of R, G and B disposed at positions of an optically equal optical path length are, as illustrated in FIG. 1, represented by a single CCD 32 for video use. The subject light incident on the imaging area of the CCD 32 for video use is photoelectrically converted by the CCD 32 for video use. Then, a video signal for recording or reproduction is generated by a given signal processing circuit in the camera body 12.

Meanwhile, on the optical path for AF use, there are arranged a relay lens RB' for AF use equivalent to the rear side relay lens RB, a mirror 18, a light splitting optical system 20 constituted of two prisms 20A and 20B, and the CCDs 16A and 16B for AF use. In the half mirror 14, the subject light passing through the front side relay lens RA and then entering the half mirror 14 is divided into two. Of the incident subject light, the subject light passing through the half mirror 14 is, as described above, guided along the main optical path of the optical axis O to the camera body 12. The subject light reflected on the half mirror 14 is guided to the optical path for AF use of the optical axis O' substantially perpendicular to the optical axis O. Of the subject light incident on the half mirror 14, about 50% thereof passes through the half mirror 14, for example. In this case, as the half mirror 14, a half mirror of any given transmissivity and reflectivity can be used.

The subject light reflected on the half mirror 14 and then guided to the optical path for AF use passes through the relay lens RB' for AF use and is thereafter totally reflected on the mirror 18 and then enters the light splitting optical system 20. The subject light incident on the light splitting optical system 20 is divided into two lines of subject light having an equal amount of light by a half mirror face M being the junction between the first prism 20A and second prism 20B. The subject light reflected on the half mirror face M is incident on the imaging area of the one CCD 16A for AF use; and the subject light passing through the half mirror face M is incident on the imaging area of the other CCD 16B for AF use.

Video signals obtained by the CDDs 16A and 16B for AF use are used in the optical path length difference type AF.

The relay lens RB' for AF use can move in a direction of the optical axis O' and is driven by a motor (not illustrated) arranged in the lens barrel. When the position of the relay lens RB' for AF use changes, the position on which the subject light branched to the optical path for AF is focused changes and thus the positional relationship between the imaging area of the CCD for AF use and the position on which the subject light is focused changes. Accordingly, there is obtained an effect equivalent to when the position of arrangement of the imaging areas of the CDDs 16A and 16B for AF use is changed.

In the AF control, based on the video signals obtained by the CDDs 16A and 16B for AF use, some of the lens groups of the focus lens FL are controlled so as to move in a direction of the optical axis O. The AF control will be described in detail later.

Figure 2:
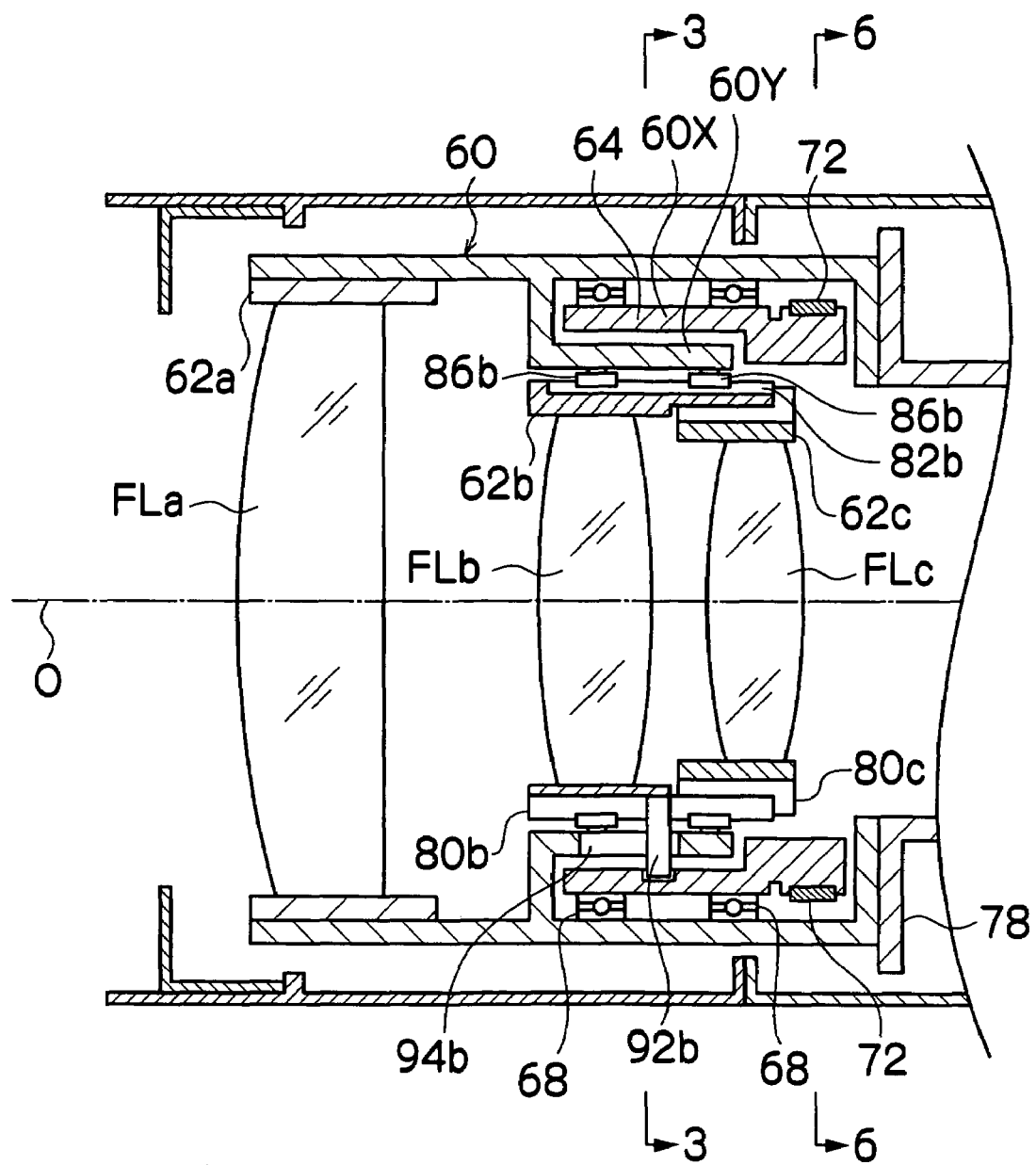
FIG. 2 is a cross-sectional view of the television lens device illustrating a drive mechanism of a focus lens.
Figure 3:
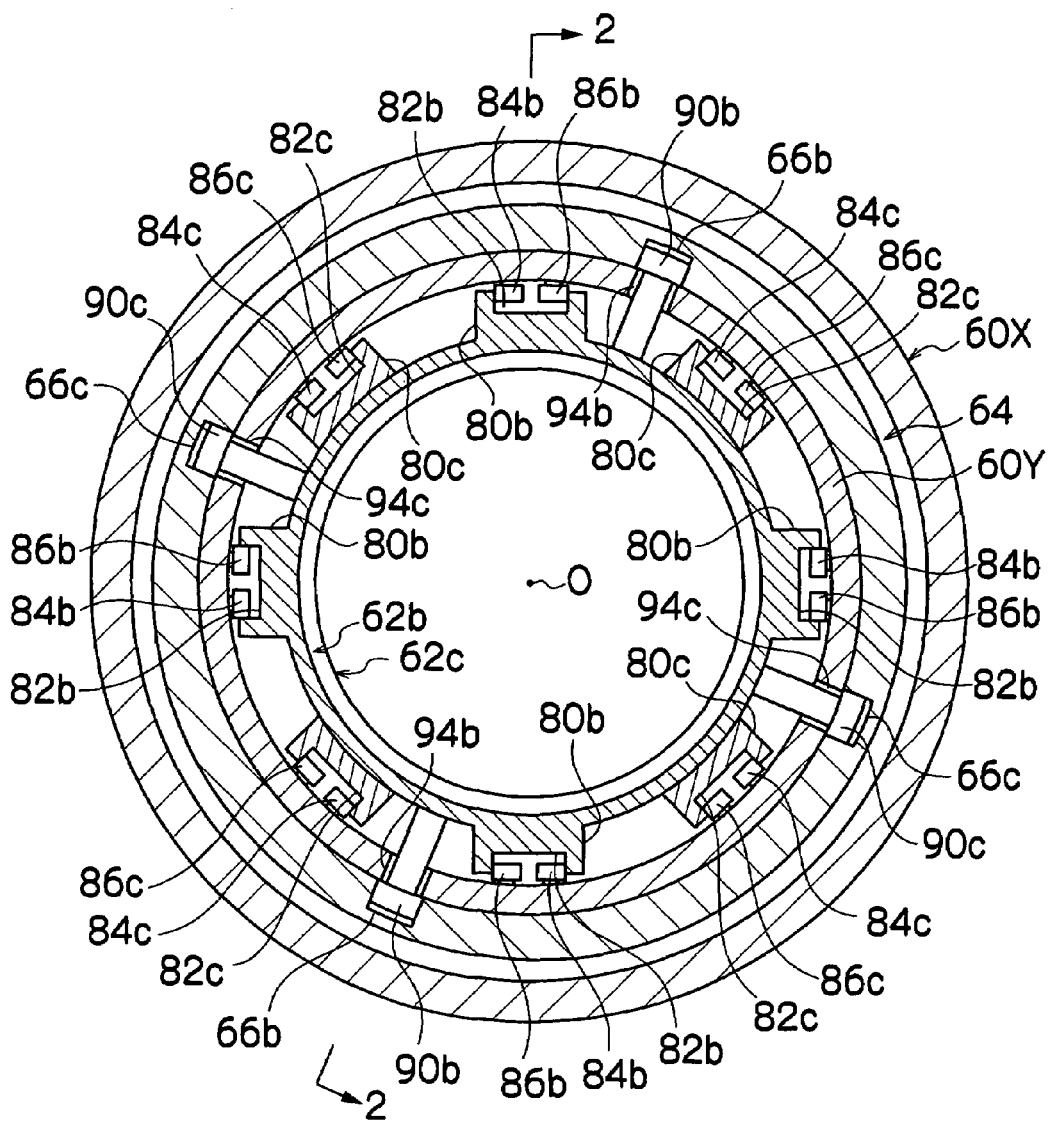
FIG. 3 is a cross-sectional view along the line 3-3 of FIG. 2.
Figure 4:
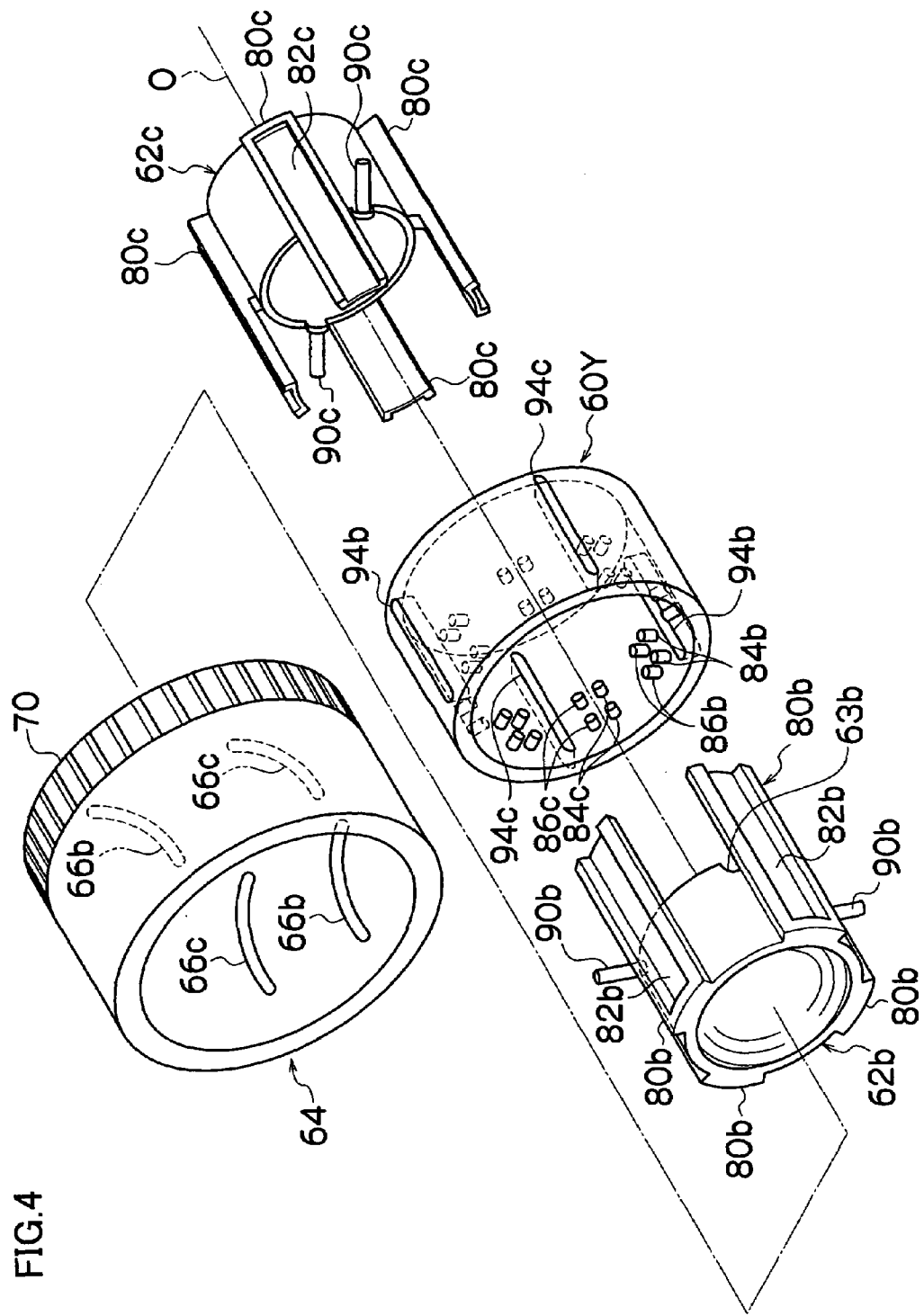
FIG. 4 is an exploded perspective view of the focus lens drive mechanism of FIG. 2.

The drive mechanism of the focus lens FL will now be described with reference to FIGS. 2 to 4. FIG. 2 is a cross-sectional view of the lens device 10; FIG. 3 is a cross-sectional view along the line 3-3 of FIG. 2; FIG. 4 illustrates an exploded perspective view thereof. FIG. 2 illustrates a cross section taken along the line 2-2 of FIG. 3.

As illustrated in FIG. 2, the focus lens FL includes three lens groups: FLa, FLb and FLc. The lens groups FLa, FLb and FLc are supported by lens frames 62a, 62b and 62c, respectively. Of the lens frames, the lens frame 62a is secured to a fixed lens barrel (main body) 60.

The fixed lens barrel 60 includes an outer cylinder 60X having a larger diameter and an inner cylinder 60Y having a smaller diameter. The lens frame 62a is secured to the tip end of the outer cylinder 60X. Also, a cam cylinder 64 is arranged between the outer cylinder 60X and inner cylinder 60Y. This cam cylinder 64 is rotatably supported via ring-shaped bearings 68 and 68 by the outer cylinder 60X.

On the inner circumferential surface of the cam cylinder 64, there are formed, as illustrated in FIG. 3, four cam grooves 66b, 66b, 66c and 66c. Cam pins 90b and 90c described later are engaged with these cam grooves 66b and 66c.

Figure 5:
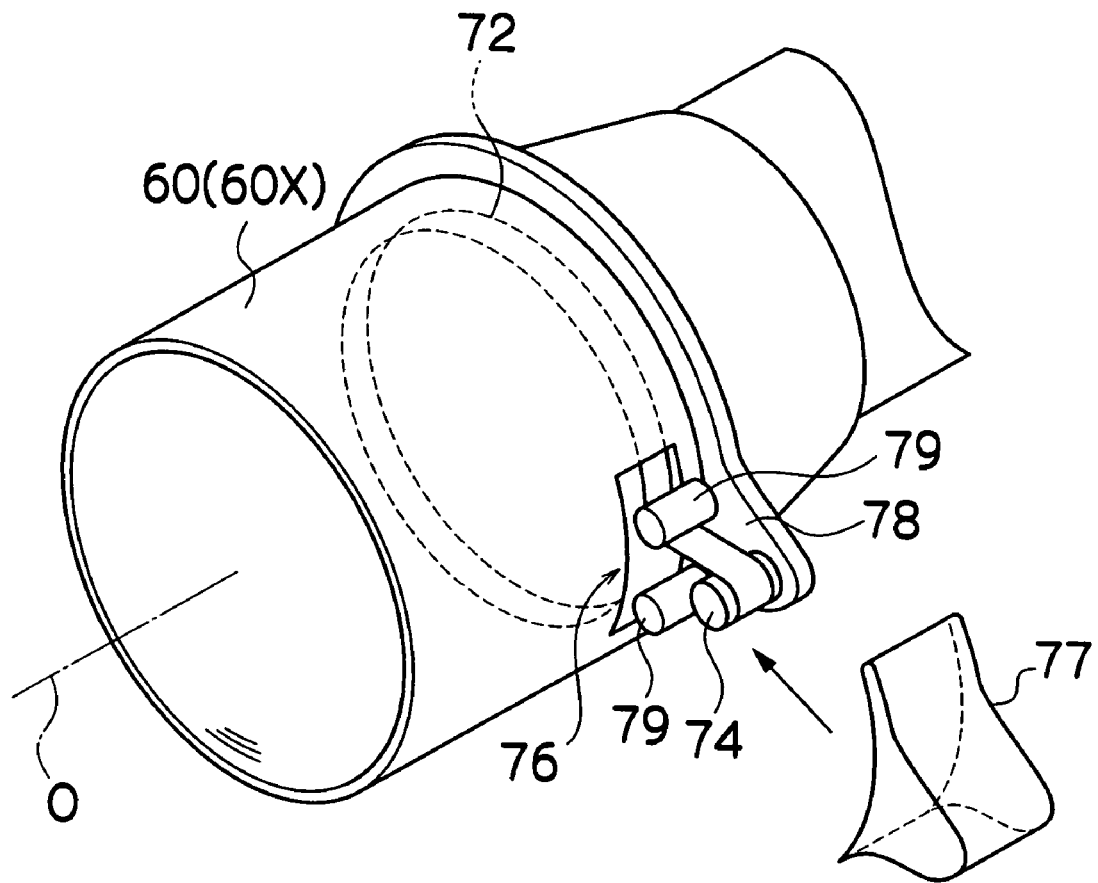
FIG. 5 is a perspective view illustrating a drive mechanism of a cam cylinder.
Figure 6:
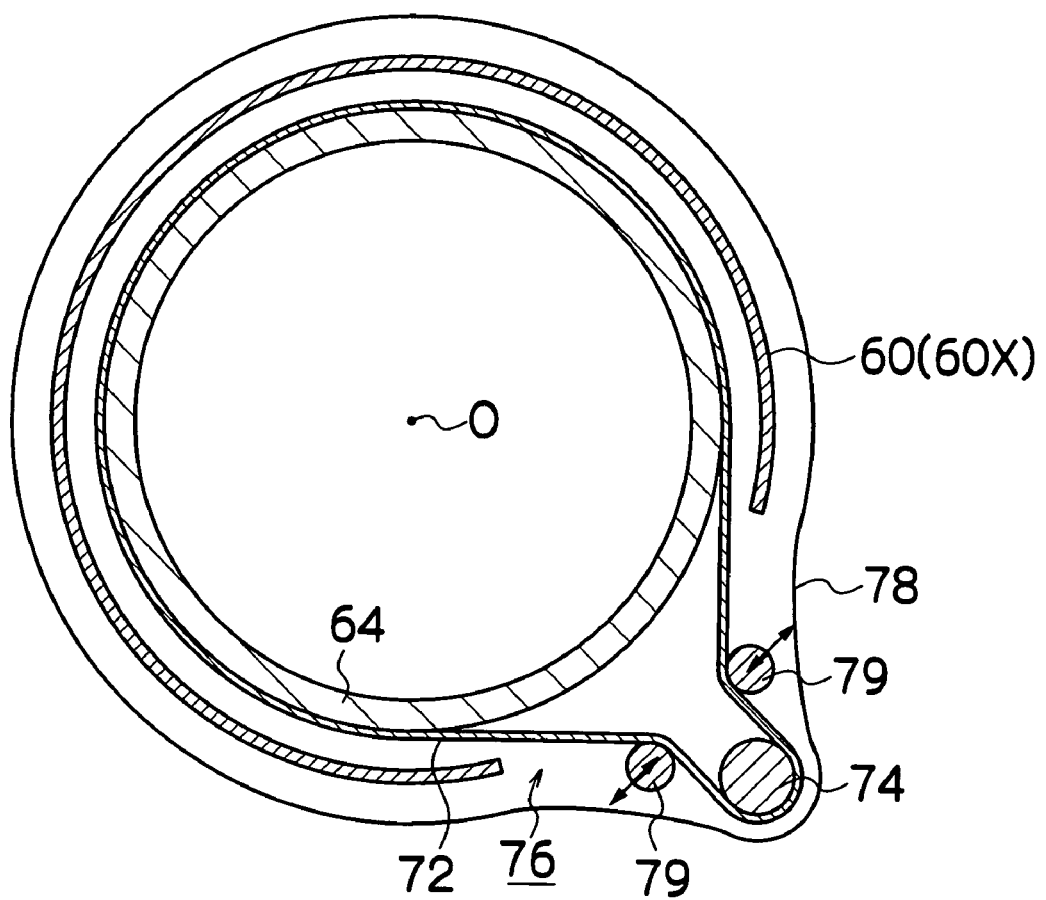
FIG. 6 is a cross-sectional view along the line 6-6 of FIG. 2.

As illustrated in FIG. 4, on the outer circumferential surface of the base end side of the cam cylinder 64, there is formed a gear 70. An endless belt 72 illustrated in FIGS. 5 and 6 is engaged with this gear 70. The endless belt 72 is extracted via an opening 76 formed in the outer cylinder 60X of the fixed lens barrel 60 to the outer side of the fixed lens barrel 60, and wrapped around a pulley 74. The pulley 74 is rotatably supported by a main body 78 coupled with the fixed lens barrel 60, and is coupled with the rotation axis of a motor (not illustrated). Accordingly, when the motor is driven, the pulley 74 rotates and thus the endless belt 72 moves on the circumference, so the cam cylinder 64 can be rotated.

Also, tension adjustment rollers 79 and 79 are engaged with the endless belt 72. The tension adjustment rollers 79 and 79 are disposed in the outer side of the fixed lens barrel 60 and at the same time mounted on the main body 78, being rotatably supported. Also, the position of the tension adjustment rollers 79 and 79 can be adjusted in a direction of the arrow of FIG. 6; the tension of the endless belt 72 is adjusted by adjusting the position of the tension adjustment rollers 79 and 79. Accordingly, the endless belt 72 can be wrapped around the cam cylinder 64 and gear 70 at a predetermined tension and thus the rotation drive force of the motor can be unfailingly transmitted to the cam cylinder 64.

A cover 77 of FIG. 5 is detachably mounted in the opening 76 of the fixed lens barrel 60. When this cover 77 is mounted, the pulley 74, tension adjustment rollers 79 and 79, and part of the endless belt 72 are contained in the interior of the cover 77. Accordingly, there is no exposure of the movable parts, and thus it is possible to unfailingly prevent dust or the like from attaching to the movable parts and causing an operational trouble.

As illustrated in FIG. 2, in the inner side of the inner cylinder 60Y of the fixed lens barrel 60, there are arranged the lens frame 62b holding the focus lens FLb and the lens frame 62c holding the focus lens FLc.

As illustrated in FIG. 4, on the outer circumferential surface of the lens frame 62b, four guide members 80b, 80b . . . are formed integrally with the lens frame 62b. The guide members 80b are spaced equally (a spacing of 90°) in a circumferential direction. Also, the guide members 80b protrude from the outer circumferential surface of the lens frame 62b to the outside and at the same time are extended toward the lens frame 62c in a direction of the optical axis O. On the outer surface of the guide member 80b, there is formed the straight groove 82b in a direction of the optical axis O, and the guide pins 84b and 86b are engaged with this straight groove 82b.

Figure 7:
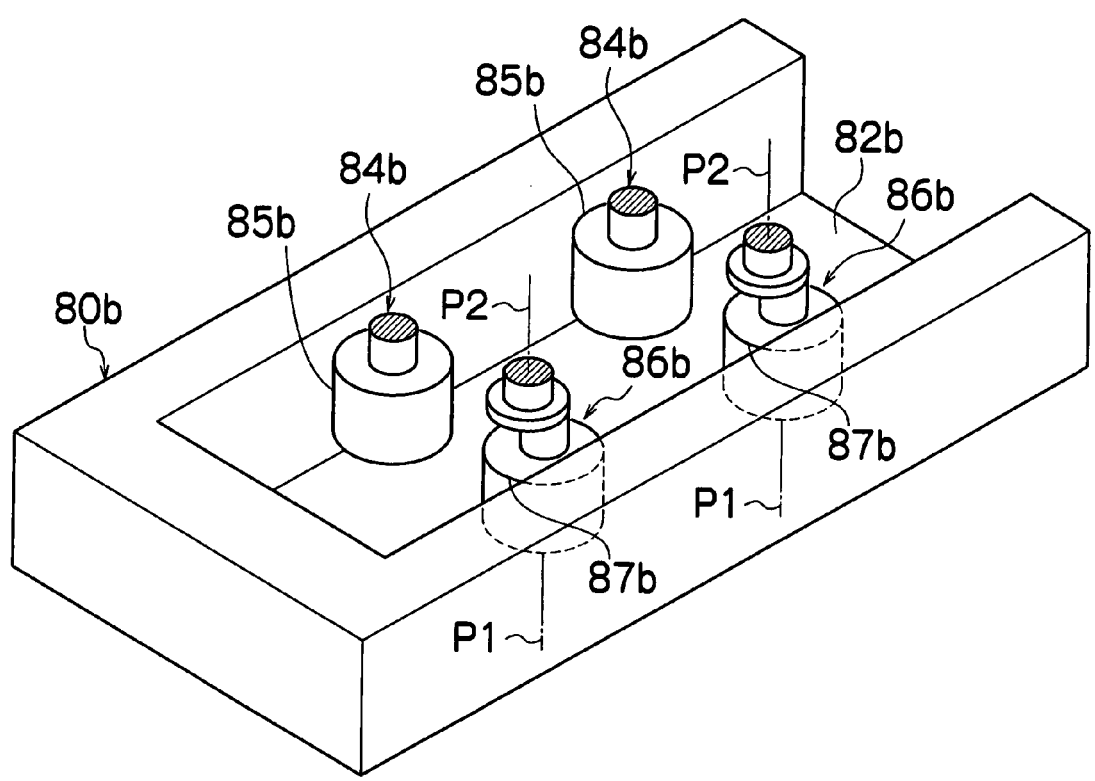
FIG. 7 is a perspective view illustrating a guide member and a guide pin.

The guide pins 84b and 86b are disposed on the inner circumferential surface of the inner cylinder 60Y of the fixed lens barrel 60. Also, as illustrated in FIG. 7, rollers 85b and 87b are rotatably supported by the tip end of the guide pins 84b and 86b, and the guide pins 84b and 86b are engaged with the straight groove 82b via these rollers 85b and 87b. Two guide pins 84b and two guide pins 86b are engaged with one straight groove 82b. In the guide pins 86b, the rotation axis p1 of the roller 87b and the mounting axis p2 in mounting the guide pin 86b in the fixed lens barrel 60 are disposed in an eccentric manner. Consequently, the position of the roller 87b can be adjusted by rotating the guide pins 86b around the mounting axis p2 and thus the roller 87b can be unfailingly engaged with the side wall of the straight groove 82b.

In this way, the guide member 80b having the straight groove 82b is arranged in the lens frame 62b, and the guide pins 84b and 86b engaging with the straight groove 82b are arranged in the fixed lens barrel 60. Thus, the lens frame 62b is supported in such a manner as to be movable in a direction of the optical axis O relative to the fixed lens barrel 60.

As illustrated in FIG. 3, two cam pins 90b are arranged in a protruding manner on the outer circumferential surface of the lens frame 62b. The cam pins 90b are each disposed at a position different from the guide member 80b in a circumferential direction. Also, as illustrated in FIG. 4, the cam pins 90b are disposed at the lens frame 62c side end of the lens frame 62b in a direction of the optical axis O. This cam pins 90b are disposed so as to penetrate through an opening 94b in a direction of the optical axis O of the fixed lens barrel 60, and are engaged with the cam grooves 66b of the cam cylinder 64. Consequently, when the cam cylinder 64 is rotated, the cam pins 90b move in a direction of the optical axis O, and the lens frame 62b moves longitudinally in a direction of the optical axis O. In this case, the opening 94b of the fixed lens barrel 60 is formed so as to have a width larger than the diameter of the cam pin 90b, and thus the cam pin 90b is disposed so as not to contact the fixed lens barrel 60.

Figure 8:
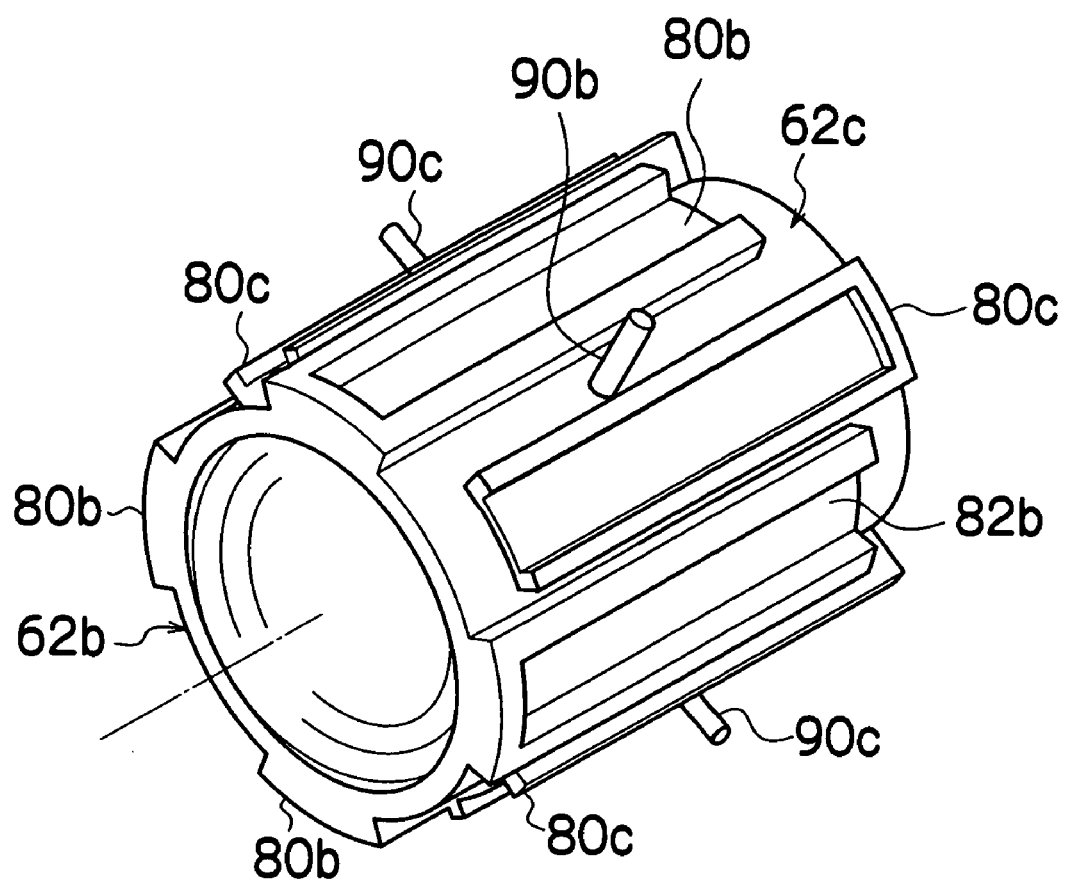
FIG. 8 is a perspective view illustrating a state in which lens frames are combined.

Meanwhile, the lens frame 62c is as illustrated in FIG. 2, formed so that its external diameter is smaller than the inner diameter of the lens frame 62b, and thus the lens frame 62c can be combined with the inner side of the lens frame 62b in a nested manner. As illustrated in FIG. 4, similarly to the lens frame 62b, the lens frame 62c has arranged on the outer circumferential surface thereof four guide members 80c, 80c . . . . The guide members 80c are spaced equally (a spacing of 90°) in a circumferential direction and formed integrally with the lens frame 62c. Also, the guide members 80c protrude from the outer circumferential surface of the lens frame 62c to the outside and at the same time are extended toward the lens frame 62b in a direction of the optical axis O. When the lens frame 62b and lens frame 62c are combined in a nested manner, this guide member 80c is as illustrated in FIG. 8, disposed in the outer side of the lens frame 62b and at the same time between the guide members 80b and 80b. More specifically, when the lens frame 62b and lens frame 62c are combined in a nested manner, the guide members 80b and 80c are disposed in an alternate manner in a circumferential direction.

As illustrated in FIG. 4, on the outer surface of the guide member 80c, there is formed the straight groove 82c in a direction of the optical axis O, and the guide pins 84c and 86c are engaged with this straight groove 82c. The guide pins 84c and 86c are disposed on the inner surface of the inner cylinder 60Y of the fixed lens barrel 60. Also, similarly to the guide pins 84*b* and 86*b*, in the guide pins 84*c* and 86*c*, a roller (not illustrated) is rotatably supported by the tip end thereof, and the guide pins 84*c* and 86*c* are engaged with the straight groove 82*c* via this roller. The two guide pins 84*c* and the two guide pins 86*c* are disposed so as to engage with one straight groove 82*c*. In the guide pin 86*c*, similarly to the guide pin 86*b*, the rotation axis of the roller and the mounting axis are disposed in an eccentric manner and thus the position of the roller can be freely adjusted.

In this way, the guide member 80*c* having the straight groove 82*c* is arranged in the lens frame 62*c*, and the guide pins 84*c* and 86*c* engaging with the straight groove 82*c* are arranged in the fixed lens barrel 60. Thus, the lens frame 62*c* is supported in such a manner as to be movable in a direction of the optical axis O relative to the fixed lens barrel 60.

The cam pins 90*c* are arranged in a protruding manner on the outer circumferential surface of the lens frame 62*c*. The cam pins 90*c* are disposed at a position different from the guide member 80*c* in a circumferential direction. Also, as illustrated in FIG. 4, the cam pins 90*c* are disposed at the lens frame 62*b* side end of the lens frame 62*c* in a direction of the optical axis O. When the lens frame 62*b* and lens frame 62*c* are combined in a nested manner and assembled into the fixed lens barrel 60, these cam pins 90*c* are disposed at a position different from the cam pins 90*b* of the lens frame 62*b* in a circumferential direction and at the same time at substantially the same position in a direction of the optical axis O. In this case, in the lens frame 62*c* side end of the lens frame 62*b*, there is formed a notch groove 63*b* at the position of the cam pin 90*c*, and the cam pin 90*c* fits into this notch groove 63*b* in a non-contact manner. Accordingly, the cam pin 90*b* and cam pin 90*c* are disposed at substantially the same position in a direction of the optical axis O.

The cam pin 90*c* is disposed in such a manner as to penetrate through an opening 94*c* in a direction of the optical axis O formed in the inner cylinder 60Y of the fixed lens barrel 60, and is engaged with the cam groove 66*c* of the cam cylinder 64. Consequently, when the cam cylinder 64 is rotated, the cam pin 90*c* moves in a direction of the optical axis O, and the lens frame 62*c* moves longitudinally in a direction of the optical axis O. In this case, the opening 94*c* of the fixed lens barrel 60 is formed so as to have a width larger than the diameter of the cam pin 90*c*, and thus the cam pin 90*c* is disposed so as not to contact the fixed lens barrel 60.

In the cam cylinder 64, the cam groove 66*b* and cam groove 66*c* are formed so as to have a different shape from each other, and thus the movement lens frame 62*b* and movement lens frame 62*c* move in a movement pattern different (i.e., different movement velocity, different movement amount, or different timing) from each other.

According to the lens device 10 configured as described above, in the lens frames 62*b* and 62*c* holding the focus lens groups FLb and FLc, there are arranged the cam pins 90*b* and 90*c*, respectively, and these cam pins 90*b* and 90*c* are engaged with the cam grooves 66*b* and 66*c* of the cam cylinder 64, respectively. Consequently, when the cam cylinder 64 is rotated, the focus lens groups FLb and FLc can be moved longitudinally in a direction of the optical axis O in a different movement pattern from each other.

Also, according to the above described lens device 10, the lens frame 62*c* is disposed in the inner side of the lens frame 62*b* and combined with the lens frame 62*b* in a nested manner; the cam pins 90*b* and 90*c* are disposed at a position different from each other in a circumferential direction and at the same time at substantially the same position in a direction of the optical axis O. In this way, when the cam pins 90*b* and 90*c* are disposed at substantially the same position in a direction of the optical axis O, the formation areas of the cam grooves 66*b* and 66*c* of the cam cylinder 64 can overlap with each other in a direction of the optical axis O. Consequently, the cam cylinder 64 can be shortened in a direction of the optical axis O and thus the lens device 10 can be miniaturized in a direction of the optical axis O.

Also, according to the above described lens device 10, the guide member 80*c* of the lens frame 62 fits between the guide members 80*b* and 80*b* of the lens frame 62*b* and thus the guide member 80*b* and guide member 80*c* are disposed in an alternate manner. Consequently, even when the guide members 80*b* and 80*c* are longer in a direction of the optical axis O, the lens frames 62*b* and 62*c* can be disposed in proximity to each other.

In the above described embodiment, the two-group floating system has been described, but the present invention may also be applied to a floating system of three or more groups. In this case, also, the lens device can be miniaturized in a direction of the optical axis O by combining the lens frames in a nested manner. According to the present invention, "combining in a nested manner" means that parts of each lens frame overlap with each other in a direction of the optical axis.

The AF control according to the present embodiment will now be described.

Figure 9:
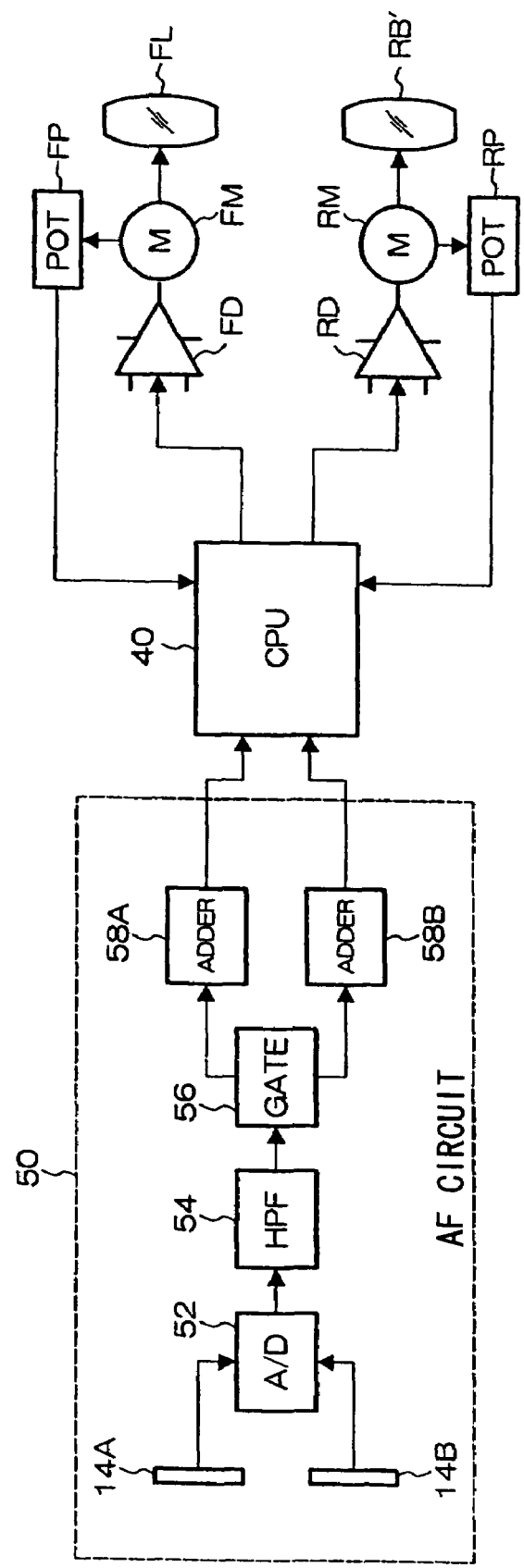
FIG. 9 is a configuration diagram illustrating a configuration of a control system related to AF control.

FIG. 9 is a configuration diagram illustrating the configuration of a control system related to the AF control using the above described lens device 10. It is noted that constituent components of the control system are mostly mounted in a drive unit (not illustrated) installed in the side of the lens barrel.

The control system related to the AF control controls the focus lens FL (that is, the above described FLb and FLc) and the relay lens RB' for AF use, and is constituted of a CPU 40 that panoptically controls the entire system, motors FM and RM connected respectively to the focus lens FL and relay lens RB' for AF use, position sensors FP and RP, amplifiers FD and RD connected to the respective motors FM and RM, and an AF circuit 50 and the like which acquires information required for the AF control based on video signals obtained from a pair of the above described CDDs 14A and 14B for AF use.

When the CPU 40 outputs drive signals of a predetermined value to the amplifiers FD and RD, the motors FM and RM rotates at a velocity dependent on the value of drive signals, and the focus lens FL and the relay lens RB' for AF use move at a velocity dependent on the rotation velocity of the motors FM and RM, respectively. Also, the position sensors FP and RP supply to the CPU 40 a position signal indicating the current positions of the focus lens FL and relay lens RB' for AF use. Accordingly, the CPU 40 can perform control such that focus lens FL and relay lens RB' for AF use are adjusted to a desired movement velocity or a desired position.

During AF control, the CPU 40 controls based on AF information obtained from the AF circuit 50, the focus lens FL so that a specified subject in a video image captured by the CCD 32 for video use of the camera body 12 enters the in-focus state.

Figure 10:
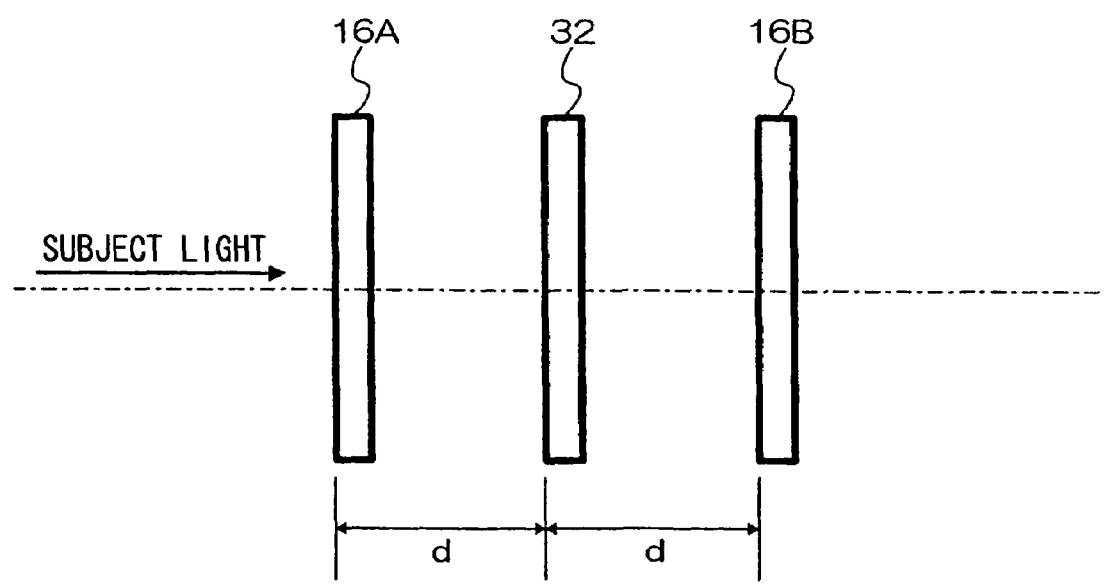
FIG. 10 is a view showing a CCD for video use of the camera body and a pair of CCDs for AF use on the same optical axis.

The basic control content of AF control performed in the present auto focus system will now be described. FIG. 10 is a view showing the CCD 32 for video use of the camera body 12 and a pair of the CDDs 16A and 16B for AF use on the identical optical axis. As illustrated in FIG. 10, the optical path length of subject light incident on the imaging area of the one CCD 16A for AF use is set shorter than the optical path length of subject light incident on the imaging area of the other CCD 16B for AF use; and in the reference state, the optical path length of subject light incident on the imaging area of the CCD 32 for video use is set to an intermediate length therebetween. That is, the imaging areas of a pair of the CDDs 16A and 16B for AF use are each disposed so as to be positioned at a longitudinally equal distance d from the imaging area of the CCD 32 for video use. It is noted that when the position of the relay lens RB' for AF use moves as described later, the relationship of position between the imaging area of the CCD 32 for video use and the imaging area of the CDDs 16A and 16B for AF use changes, and the position of the relay lens RB' for AF use when such reference state is obtained is set as the reference position.

Using a pair of the CDDs 16A and 16B for AF use disposed in the lens device 10 in this manner, there are obtained video signals of the subject light incident on the lens device 10, which are equivalent to the video signals obtained when the imaging area of the CCD 32 for video use is disposed at a longitudinally equal distance from the current position thereof. In this case, the CDDs 16A and 16B for AF use don't need to produce color video signals; in the present embodiment, monochrome video signals (luminance signals) are obtained from the CDDs 16A and 16B for AF use.

In the AF circuit 50 of FIG. 9, the video signals obtained by the CDDs 16A and 16B for AF use are converted into digital signals by an A/D converter 52, and thereafter inputted to a high-pass filter (HPF) 54; and only high frequency component signals are extracted from the inputted video signals by the high-pass filter 54. Then, the high frequency component signal of the video signal is inputted to a gate circuit 56; and a video signal within the area corresponding to a predetermined AF area (for example, a rectangular area at the center of screen) set within the imaging area (screen) is extracted by the gate circuit 56.

The above AF area may be set according to an instruction signal from the CPU 40; the operator may specify a desired area by use of a given controller.

Of the video signals extracted by the gate circuit 56, the video signal obtained from the CCD 16A for AF use is accumulated field by field by an adder circuit 58A; the video signal obtained from the CCD 16B for AF use is accumulated field by field by an adder circuit 58B. The accumulated value is outputted field by field from the AF circuit 50.

In this way, the accumulated values obtained from the adder circuits 58A and 58B each indicate a value for evaluating the magnitude of contrast of the subject image captured by the CDDs 16A and 16B for AF use. In the present specification, this accumulated value is referred to as a focus evaluation value. The focus evaluation value obtained from the video signal of the CCD 16A for AF use is referred to as a focus evaluation value of ch A, and the focus evaluation value obtained from the video signal of the CCD 16B for AF use is referred to as a focus evaluation value of ch B.

Figure 11:
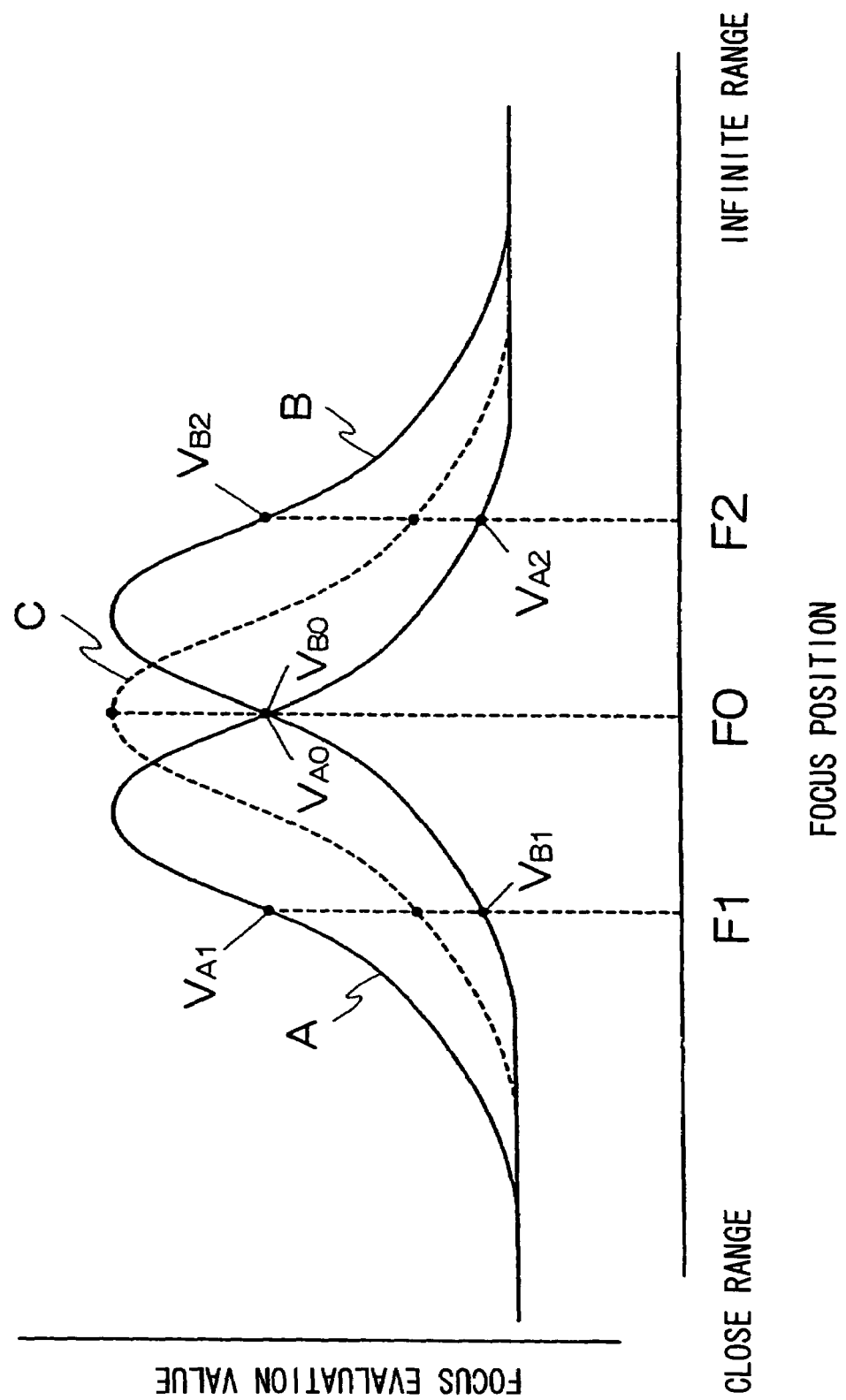
FIG. 11 is an explanatory diagram used in explaining the focus state detection principle.

The CPU 40 detects based on the focus evaluation values of ch A and ch B obtained in this manner, a focus state of the imaging optical system with respect to the CCD 32 for video use. The focus state detection is performed according to the following principle. FIG. 11 is a view exemplarily illustrating the relationship between the focus position and focus evaluation value when an image of subject is taken, wherein the abscissa indicates the position (focus position) of the focus lens FL of the lens device 10 and the ordinate indicates the focus evaluation value. Curves A and B indicated by a solid line in FIG. 11 each show the focus evaluation values of ch A and ch B obtained from the CDDs 16A and 16B for AF use relative to the focus position. Meanwhile, curve C indicated by a dotted line in FIG. 11 shows the focus evaluation value relative to the focus position on the assumption that the focus evaluation value is determined from a video signal obtained from the CCD 32 for video use.

Referring to FIG. 11, when the focus is set to the focus position F0 corresponding to when the focus evaluation value of the CCD 32 for video use indicated by curve C becomes maximum (local maximum), the focus state enters the in-focus state. If the focus of the imaging optical system is set to a focus position F1 in a range closer than the in-focus position F0, the focus evaluation value of ch A changes to a value VA1 of curve A corresponding to the focus position F1, and the focus evaluation value of ch B changes to a value VB1 of curve B corresponding to the focus position F1. In this case, as evident from FIG. 11, the focus evaluation value VA1 of ch A is larger than the focus evaluation value VB1 of ch B. From this, it can be seen that when the focus evaluation value VA1 of ch A is larger than the focus evaluation value VB1 of ch B, there is obtained a state in which the focus is set to a position in a closer range than the in-focus position F0, that is, a front focus state.

Meanwhile, if the focus of the imaging optical system is set to a focus position F2 apart from the in-focus position F0 in an infinite direction, the focus evaluation value of ch A changes to a value VA2 of curve A corresponding to the focus position F2, and the focus evaluation value of ch B changes to a value VB2 of curve B corresponding to the focus position F2. In this case, the focus evaluation value VA2 of ch A is smaller than the focus evaluation value VB2 of ch B. From this, it can be seen that when the focus evaluation value VA2 of ch A is smaller than the focus evaluation value VB2 of ch B, there is obtained a state in which the focus is set to a position apart from the in-focus position F0 in an infinite direction, that is, a rear focus state.

In contrast, when the focus of the imaging optical system is set to the focus position F0, i.e., the in-focus position, then the focus evaluation value of ch A changes to a value VA0 of curve A corresponding to the focus position F0, and the focus evaluation value of ch B changes to a value VB0 of curve B corresponding to the focus position F0.

In this case, the focus evaluation value VA0 of ch A is equal to the focus evaluation value VB0 of ch B. From this, it can be seen that when the focus evaluation value VA0 of ch A is equal to the focus evaluation value VB0 of ch B, there is obtained a state in which the focus is set to the in-focus position F0, i.e., the in-focus state.

In this way, it can be detected based on the focus evaluation values of ch A and ch B whether the current focus of the imaging optical system is in a front focus, rear focus or in-focus state relative to the CCD 32 for video use.

During AF control, while sequentially detecting as described above, a focus state of the imaging optical system relative to the CCD 32 for video use based on the focus evaluation values of ch A and ch B, the CPU 40 of FIG. 9 controls the focus lens FL so that the in-focus state is obtained. For example, when the focus is in a front focus state, the focus lens FL is moved in an infinite direction; when the focus is in a rear focus state, the focus lens FL is moved in a close-range direction; and when the focus is in the in-focus state, the focus lens FL is stopped. The focus lens FL is then moved to the in-focus position of the taking lens and stops. The AF system of performing automatic focus adjustment in this manner by use of a plurality of CCDs for AF use having optical path length differences is called an optical path length difference system.

What is claimed is:

1. A lens device comprising:

a plurality of focus lens groups;

a plurality of movement lens frames respectively holding the plurality of focus lens groups;

a plurality of cam pins arranged respectively in the plurality of movement lens frames;

a fixed lens barrel supporting the plurality of movement lens frames so that the movement lens frames are movable in a direction of the optical axis; and a cam cylinder supported rotatably by the fixed lens barrel and at the same time having a plurality of cam grooves engaged respectively with the plurality of cam pins, wherein the plurality of movement lens frames are disposed such that a part of one movement lens frame overlaps with another movement lens frame in a direction of the optical axis, and are combined in a nested manner, and the plurality of cam pins are disposed at a different position from each other in a circumferential direction, and at the same time the cam pin of the one movement lens frame and the cam pin of another said movement lens frame are disposed at substantially the same position in a direction of the optical axis when the movement lens frames are brought into closest proximity to each other, wherein the plurality of movement lens frames are each provided with a guide member protruding from the outer circumferential surface of the movement lens frame and at the same time extending outwards in a direction of the optical axis, a straight groove in a direction of the optical axis is formed in the guide member, and a guide pin engaged with the straight groove is arranged in the fixed lens barrel, and when the plurality of movement lens frames are combined in a nested manner, the guide member of one lens frame lies between the guide members of the other lens frames and thus the guide members are disposed in an alternate manner.

2. A lens device comprising:

a plurality of focus lens groups;

a plurality of movement lens frames respectively holding the plurality of focus lens groups;

a plurality of cam pins arranged respectively in the plurality of movement lens frames;

a fixed lens barrel supporting the plurality of movement lens frames so that the movement lens frames are movable in a direction of the optical axis; and a cam cylinder supported rotatably by the fixed lens barrel and at the same time having a plurality of cam grooves engaged respectively with the plurality of cam pins, wherein the plurality of movement lens frames are disposed such that a part of one movement lens frame overlaps with another movement lens frame in a direction of the optical axis, and are combined in a nested manner, and the plurality of cam pins are disposed at a different position from each other in a circumferential direction, and at the same time the cam pin of the one movement lens frame and the cam pin of another said movement lens frame are disposed at substantially the same position in a direction of the optical axis when the movement lens frames are brought into closest proximity to each other, wherein the plurality of movement lens frames are each provided with a guide member protruding from the outer circumferential surface of the movement lens frame and at the same time extending outwards in a direction of the optical axis, a straight groove in a direction of the optical axis is formed in the guide member, and a guide pin engaged with the straight groove is arranged in the fixed lens barrel, and when the plurality of movement lens frames are combined in a nested manner, the guide member of one lens frame lies between the guide members of the other lens frames and thus the guide members are disposed in an alternate manner, and wherein the guide pin has a roller rotatably supported, and is engaged with the straight groove via the roller, and the rotation axis of the roller and the mounting axis in mounting the guide pin in the fixed lens barrel are disposed in an eccentric manner.

* * * * *